(12) United States Patent
Bowers et al.

(10) Patent No.: US 12,555,055 B2
(45) Date of Patent: Feb. 17, 2026

(54) CENTRALIZED ORCHESTRATION OF WORKFLOW COMPONENT EXECUTIONS ACROSS SOFTWARE SERVICES

(71) Applicant: Indeed, Inc., Austin, TX (US)

(72) Inventors: John Bowers, Austin, TX (US); Xiqian Han, Kenmore, WA (US); Quanzheng Long, Seattle, WA (US); Jacob Lucas, Seattle, WA (US); Russel Mommaerts, Seattle, WA (US); Jeremy Spencer, Seattle, WA (US); Hemant Tanwar, Renton, WA (US); David Thrift, Austin, TX (US); Adam Ullrich, Austin, TX (US); Christopher Valencia, Seattle, WA (US)

(73) Assignee: Indeed, Inc., Austin, TX (US)

( * ) Notice: Subject to any disclaimer, the term of this patent is extended or adjusted under 35 U.S.C. 154(b) by 235 days.

(21) Appl. No.: 17/962,862

(22) Filed: Oct. 10, 2022

(65) Prior Publication Data

US 2024/0119383 A1 Apr. 11, 2024

(51) Int. Cl.
*G06Q 10/0633* (2023.01)
*G06Q 10/1053* (2023.01)

(52) U.S. Cl.
CPC ..... *G06Q 10/0633* (2013.01); *G06Q 10/1053* (2013.01)

(58) Field of Classification Search
None
See application file for complete search history.

(56) References Cited

U.S. PATENT DOCUMENTS

| | | | |
|---|---|---|---|
| 2006/0026161 A1* | 2/2006 | Henseler | G06F 9/50 |
| 2006/0235884 A1* | 10/2006 | Pfenninger | G06Q 10/063112 |
| 2012/0317174 A1* | 12/2012 | Miller | G06Q 10/10 |
| | | | 709/203 |

(Continued)

OTHER PUBLICATIONS

Tratt, "Domain specific language implementation via compile-time meta-programming", 2008, ACM Transactions on Programming Languages and Systems (TOPLAS), vol. 30, No. 6, pp. 1-40 (Year: 2008).*

(Continued)

*Primary Examiner* — Ivan R Goldberg
(74) *Attorney, Agent, or Firm* — Young Basile Hanlon & MacFarlane, P.C.

(57) ABSTRACT

An orchestration system of or otherwise available to a web platform centralizes the execution of workflow components of a workflow associated with a job posting hosted by the web platform using various software services internal and/or external to the web platform. The workflow components and attributes thereof are determined based on the job posting. Domain-specific language (DSL) instructions for the various workflow components are generated. First DSL instructions are invoked by the orchestration system to cause an execution of a first workflow component of the workflow by a first software service. The orchestration system obtains an output of the first workflow component, such as values of relevant attributes, and, based on the output and in some cases information derived other than from the first workflow component, invokes next DSL instructions to cause an execution of a next workflow component of the workflow by another software service.

20 Claims, 7 Drawing Sheets

(56) References Cited

U.S. PATENT DOCUMENTS

| | | | |
|---|---|---|---|
| 2013/0290208 A1* | 10/2013 | Bonmassar | G06Q 10/1053 |
| | | | 705/321 |
| 2014/0278683 A1* | 9/2014 | Kennell | G06Q 10/1095 |
| | | | 705/7.19 |
| 2015/0286990 A1* | 10/2015 | Adair | G06Q 10/1053 |
| | | | 705/319 |
| 2017/0357943 A1* | 12/2017 | Tiner | G06Q 10/1053 |
| 2019/0312789 A1* | 10/2019 | Asbi | G06F 8/61 |
| 2020/0005243 A1* | 1/2020 | Pong | G06Q 10/0633 |

OTHER PUBLICATIONS

Gupta, et al., "Automation in recruitment: a new frontier," 2018, Journal of Information Technology Teaching Cases, vol. 8, No. 2, pp. 118-125 (Year: 2018).*

* cited by examiner

WORKFLOW COMPONENTS

☒ APPLICATION SCREENING

☒ INTERVIEW SCHEDULING

☐ POST-INTERVIEW ASSESSMENT

☒ BACKGROUND CHECK

ATTRIBUTES

☒ MINIMUM YEARS OF EXPERIENCE: [5 ▽]

☐ WILLING TO WORK FROM OFFICE/HYBRID

☐ FULL TIME ONLY

☒ REFERENCES REQUIRED

FIG. 6

CENTRALIZED ORCHESTRATION OF WORKFLOW COMPONENT EXECUTIONS ACROSS SOFTWARE SERVICES

BACKGROUND

Job websites are effective and increasingly popular platforms for connecting skilled job seekers and job posters in need of support. A job poster may use a job website or a third party system interfacing with the job website to create a job posting for a specific type of work, and job seekers matching criteria listed in the job posting may interact with the job posting to pursue a new work opportunity. Similarly, a job seeker may use a job website to upload resumes and other documentation representing their skills and relevant background information to attract desirable job posters.

SUMMARY

Disclosed herein are, inter alia, implementations of systems and techniques for the centralized orchestration of workflow component executions across software services.

One aspect of this disclosure is a method, which includes using an orchestration system configured to orchestrate execution of workflow components using software services of a web platform to determine a workflow associated with a job posting hosted by the web platform. The orchestration system invokes first instructions in a domain-specific language (DSL) to cause an execution of a first workflow component of the workflow by a first software service of the web platform. The orchestration system thereafter obtains an output of the first workflow component and, based on the output, invokes second instructions in the DSL to cause an execution of a second workflow component of the workflow by a second software service of the web platform.

Another aspect of this disclosure is a system, which includes one or more servers configured to invoke, by backend software configured to orchestrate execution of workflow components of a workflow associated with a job posting using software services of a web platform hosting the job posting, first instructions in a DSL to cause an execution of a first workflow component of the workflow by a first software service of the web platform. The one or more servers are also configured to invoke, by the backend software based on an output of the first workflow component, second instructions in the DSL to cause an execution of a second workflow component of the workflow by a second software service of the web platform.

Yet another aspect of this disclosure is a non-transitory computer readable medium storing instructions operable to cause one or more processors to perform operations, which include configuring an orchestration system of a web platform to orchestrate execution of workflow components of a workflow associated with a job posting hosted by the web platform using software services of the web platform. The orchestration system invokes first instructions in a DSL to cause an execution of a first workflow component of the workflow by a first software service of the web platform. The orchestration system, based on an output of the first workflow component, invokes second instructions in the DSL to cause an execution of a second workflow component of the workflow by a second software service of the web platform. Based on an output of the second workflow component, the orchestration system indicates a completion of the workflow.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 6 is an illustration of an example of a graphical user interface (GUI) for determining a workflow for a job posting hosted by a web platform.

DETAILED DESCRIPTION

Figure 1:
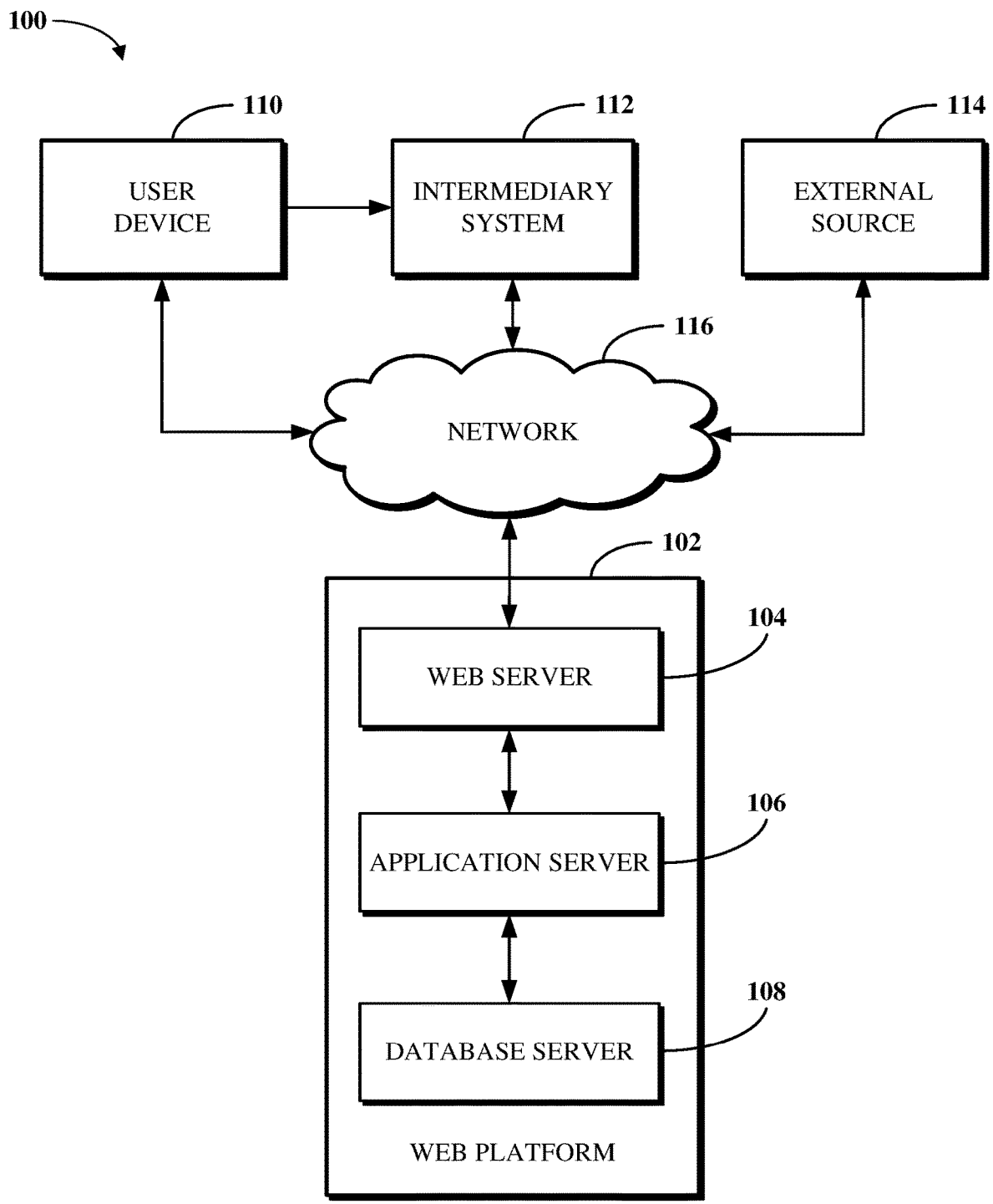
FIG. 1 is a block diagram of an example of a web platform system.

A typical hiring process based on a job posting published to a job website begins with a job seeker submitting an application containing certain biographical and qualification information relevant to the job posting. The job website could be a web service such as Indeed, ZipRecruiter, LinkedIn, and similar. Specific examples of job website products that may be used as part of a hiring process include Indeed Apply and ZipRecruiter Apply. The job website facilitates the exchange of information and communications between the job seeker and the job poster, who caused the publication of the job posting, during the hiring process until the job seeker is either hired to the position specified in the job posting or denied for that position.

The hiring process may involve several separate steps, and, in many cases, at least some of those steps may be undertaken external to the job website (e.g., using third party software). For example, the hiring process may include a step related to obtaining information from the job seeker via one or more web forms of the job website, a step related to evaluating that information against data of the job posting, a step related to scheduling a virtual or in-person interview between the job seeker and a representative of the job poster, a step related to verifying references of the job seeker, and a step related to performing a background check for the job seeker. While the first two of the steps described above may be conventionally performed within the job website itself, the last three of those steps typically require the job poster to engage with the job seeker and one or more third party services over one or more separate modalities (e.g., a scheduling system, a telephone network, and/or a background check platform).

Conventional job website tools for facilitating portions of a hiring process are generally rigid in that they are designed to effectively cover broad segments of job posting and job seeker information. These tools, which are often implemented using funnels within the job website, focus on the next step that must be performed, regardless of whether that step is one which is capable of being performed at the job website. However, because these tools are designed to work with large quantities of job postings, they typically lack the capabilities required to integrate with the vast number of software tools and services which may be used for steps performed external to the job website.

As a consequence of these technical limitations, job seekers and job posters may be forced to rely upon manual solutions, such as spreadsheets maintained external to the job website to track the progress of steps not capable of being performed at the job website (e.g., interview scheduling, conducting background checks, and third-party assessments). Unfortunately, the nature of a funnel process is that a next step generally cannot be performed unless and until a current step has been completed. This may cause issues delaying the progress of or otherwise resulting in the termination of the hiring process for a particular job seeker. This conventional hiring process model is thus flawed in that it focuses on the particular sequence of steps that must be performed as part of the hiring process.

This hiring process model additionally suffers from the inability to map fields or otherwise portions of various steps to others, resulting in frequent data collection redundancies that may hinder progress along the funnel to a next step. In particular, a job seeker filling out screening questions at an early step of the hiring process may be asked, in one or more later steps, to enter the same or substantially similar information as was provided in their answers to those screening questions. These types of redundancies most frequently occur during steps performed external to the job website due to the disconnect between the job website and a given medium used to perform such a step.

In some cases, the presentation of such redundancies and/or issues related thereto may hinder the progress of the hiring process by introducing delay at a subject step. For example, the job seeker may recall that they have already provided a certain piece of information in an earlier step and accordingly decide to omit it from a current step, not understanding that the earlier step was performed at the job website, the current step is performed external to the job website, and the job website is not configured to share the subject information with the medium at which the current step is performed. However, without a mechanism to recognize the commonalities between job seeker information requested or otherwise evaluated at various steps of a hiring process, referred to herein as attributes, the disconnect between the job website and the external media and the disparate nature of the steps performed thereby will prevent information exchange and thus continue to serve as an impediment to the hiring process.

Implementations of this disclosure accordingly address problems such as those described above by introducing a centralized mechanism for orchestrating hiring process steps independent of a traditional funnel and in a manner which renders information already provided as part of the hiring process available across entities involved in the performance of those various hiring process steps. An orchestration system is introduced to orchestrate the execution of the various components (e.g., steps) of a workflow (e.g., a hiring process). The orchestration system centrally handles the execution of the various workflow components across separate software services using a domain-specific language (DSL) on behalf of a web platform (e.g., a software platform implementing or otherwise associated with a job website through which a hiring process for a subject job posting is undertaken). The DSL expresses elements of the workflow in terms of attributes rather than steps to make such attributes available to tools performing the various workflow components other than in a funnel format. The orchestration system translates instructions in the DSL and related to a workflow component to a form usable by a subject tool internal or external to the web platform to enable that tool to perform the workflow component.

The orchestration system is configured to orchestrate execution of workflow components using software services internal and/or external to a web platform to determine a workflow associated with a job posting hosted by the web platform. The orchestration system invokes instructions in a DSL to cause an execution of workflow components of the workflow by software services internal and/or external to the web platform. The orchestration system obtains an output of a given workflow component and, based on the output, can invoke next instructions in the DSL to cause an execution of one or more other workflow components of the workflow by one or more other software services. The output may, for example, correspond to data provided by (e.g., as input from) a device of a job seeker user of the web platform within a web form or other element associated with the given workflow component.

The orchestration system is generally expressed as part of the web platform, although, in some cases, the orchestration system can be implemented and/or otherwise used other than by the web platform. For example, a separate service can implement the orchestration system in connection with a job posting hosted at the web platform. While some workflow components may have dependencies to other workflow components (e.g., requiring input derived from the output of other workflow components), in general, the orchestration system may be configured to cause the simultaneous or near simultaneous execution of two or more workflow components. For example, the output of a first workflow component used to cause an execution of a second workflow component may be obtained prior to a completion of the first workflow component.

The orchestration system obtains attribute information within the output of one or more of the workflow components and maps that attribute information to one or more other workflow components to determine next executions of workflow components. In particular, certain attributes can be specified for various workflow components when the workflow is determined. Data collected as part of input provided (e.g., from a device of a job seeker) to one or more workflow components may be evaluated to map portions thereof to one or more attributes. The mapping of data to an attribute of a workflow component not yet under execution may, provided other necessary inputs to that workflow component are then available, result in the orchestration system initiating an execution of that workflow component, regardless of whether a current workflow component has completed execution. As such, while the output including the attribute information may in some cases be obtained upon a completion of a given workflow component, in some cases, such output may be obtained prior to a completion of the workflow component, such as while the workflow component continues to execute. In this way, the orchestration system operates other than as a conventional state machine given that multiple workflow components may be concurrently executed at a given time.

While a workflow is described herein by example as a hiring process associated with a job posting hosted by a web platform, other examples of a workflow herein are possible. Similarly, while workflow components are described herein by example as steps of a hiring process associated with a job posting hosted by a web platform, other examples of workflow components are possible.

To describe some implementations in greater detail, reference is first made to examples of hardware and software structures used to implement a system for centralized orchestration of workflow component executions across software services. FIG. 1 is a block diagram of an example of a web platform system 100, which includes a web platform 102. The web platform 102 implements a job website for enabling job seeking users to upload credential details and search for job opportunities via job postings and for enabling job posting users to create and manage job postings and view engagement information associated with job seekers who have viewed and engaged with such job postings. The web platform 102 implements the job website using one or more servers, including a web server 104, an application server 106, and a database server 108. For example, the web server 104, the application server 106, and the database server 108 may be implemented by one or more servers or server racks located within one or more datacenters. A user of the web platform 102 may access the web platform 102 via a user device 110, which may, for example, be a mobile phone, a tablet computer, a laptop computer, a notebook computer, a desktop computer, or another suitable computing device or combination of computing devices.

The web server 104 processes requests (e.g., hypertext transport protocol (HTTP)-based requests) received from user devices, such as the user device 110, destined for a software service associated with the web platform 102. In particular, the web server 104 operates as a conduit to content of the web platform 102 to be served to the user device 110 in response to requests received therefrom. The content derives from the application server 106 and is routed via the web server 104 to the user device 110 for rendering at the user device 110, for example, within a web browser or other software application running at the user device.

The application server 106 runs one or more software services associated with the web platform 102 which may be delivered to the user device 110 based on requests processed via the web server 104. For example, the application server 106 may implement a web application for the job website of the web platform 102. The application server 106 can include one or more application nodes, which can each be a process executed on the application server 106 to deliver software services to the user device 110, as part of the web platform 102. An application node can be implemented using processing threads, virtual machine instantiations, or other computing features of the application server 106. In some cases where the application server 106 can includes two or more application nodes forming a node cluster, those application nodes, while implemented on a single application server 106, can run on a single hardware server or different hardware servers.

The database server 108 manages (e.g., stores or otherwise provides) data usable to deliver software services implemented by the application server 106 to the user device 110. The database server 108 may implement one or more databases, tables, or other information sources suitable for use with such a software service. The database server 108 may include a data storage unit accessible by software executed on the application server 106. A database implemented by the database server 108 may, for example, be a relational database management system, an object database, an extensible markup language (XML) database, one or more flat files, other suitable non-transient storage mechanisms, or a combination thereof. In some cases, one or more databases, tables, other suitable information sources, or portions or combinations thereof may be stored, managed, or otherwise provided by a component other than the database server 110, for example, the user device 110 or the application server 106.

In some cases, some or all of the information usable to create a job posting at the web platform 102 may derive other than from the user device 110. For example, such information may derive from one or both of an intermediary system 112 or an external source 114, such as in addition to or instead of from the user device 110.

The intermediary system 112 is software usable to route information usable to create a job posting to one or more web platforms including the web platform 102. For example, the intermediary system 112 may be an applicant tracking system (ATS). A user of an ATS may, for example, cause information associated with a job posting to be created from the ATS to each of the multiple web platforms, such as to attempt to reach a wider pool of potential job seeker candidates using different ones of those web platforms. The intermediary system 112 may obtain the information associated with the job posting directly from a user, such as via the user device 110. For example, the user device 110 may connect to a server of the intermediary system 112 to transmit text and/or other materials associated with the job posting to be created, and the intermediary system 112 may then accordingly route such obtained text and/or other materials to the multiple web platforms.

The external source 114 is an electronic communication component configured to store information in one or more contexts. For example, the external source 114 may be an online social media platform, a cloud storage system, a company website associated with the user of the user device 110, or another website or software service that at one or more times obtained and stored information which may be relevant to otherwise associated with a job posting to be created. The external source 114 may, for example, transmit such information to the web platform 102 based on a request from the web platform 102 or the user device 110 made over an application programming interface (API) call.

The user device 110, the intermediary system 112, and the external source 114 each communicates with the servers 104 through 108 of the web platform 102 via a network 116. The network 116 can be or include the Internet, a local area network (LAN), a wide area network (WAN), a virtual private network (VPN), or another public or private means of electronic computer communication capable of transferring data between devices. The network 116, or another element, or combination of elements, of the system 100 can include network hardware such as routers, switches, other network devices, or combinations thereof. For example, a datacenter at which one or more of the servers 104 through 108 are located can include a load balancer for routing traffic from the network 116 to ones of those servers at the datacenter. The load balancer can route, or direct, computing communications traffic, such as signals or messages, to respective elements of the datacenter. For example, the load balancer can operate as a proxy, or reverse proxy, for a service associated with the web platform 102 or another service provided to the user device 110, by the web server 104, the application server 106, and/or another server. Routing functions of the load balancer can be configured directly or via a DNS. In some implementations, the load balancer can operate as a firewall, allowing or preventing communications based on configuration settings.

As will be described below in further detail, the web platform system 100 in relevant part performs centralized orchestration of workflow component executions across software services in connection with job postings created at the web platform 102. In particular, the system 100 may include functionality for determining a workflow related to a job posting hosted by the web platform 102 (e.g., a hiring process for a job related to the job posting) and causing the execution of workflow components of that workflow using various software services internal and/or external to the web platform 102. An orchestration system of or otherwise usable with the web platform 102 is configured to invoke DSL instructions to cause the execution of a workflow component and to obtain output of that workflow component via the execution thereof. For example, the orchestration system can leverage a web browser-based plugin and/or an API call to cause the execution of a workflow component and/or to obtain the output of that workflow component. The orchestration system can then identify relevant attributes from within the output, map those attributes to one or more other workflow components, and accordingly invoke DLS instructions to cause the execution of those one or more other workflow components. In this way, the system 100 may centralize the execution of workflow components, thereby automating the progress through the workflow.

Figure 2:
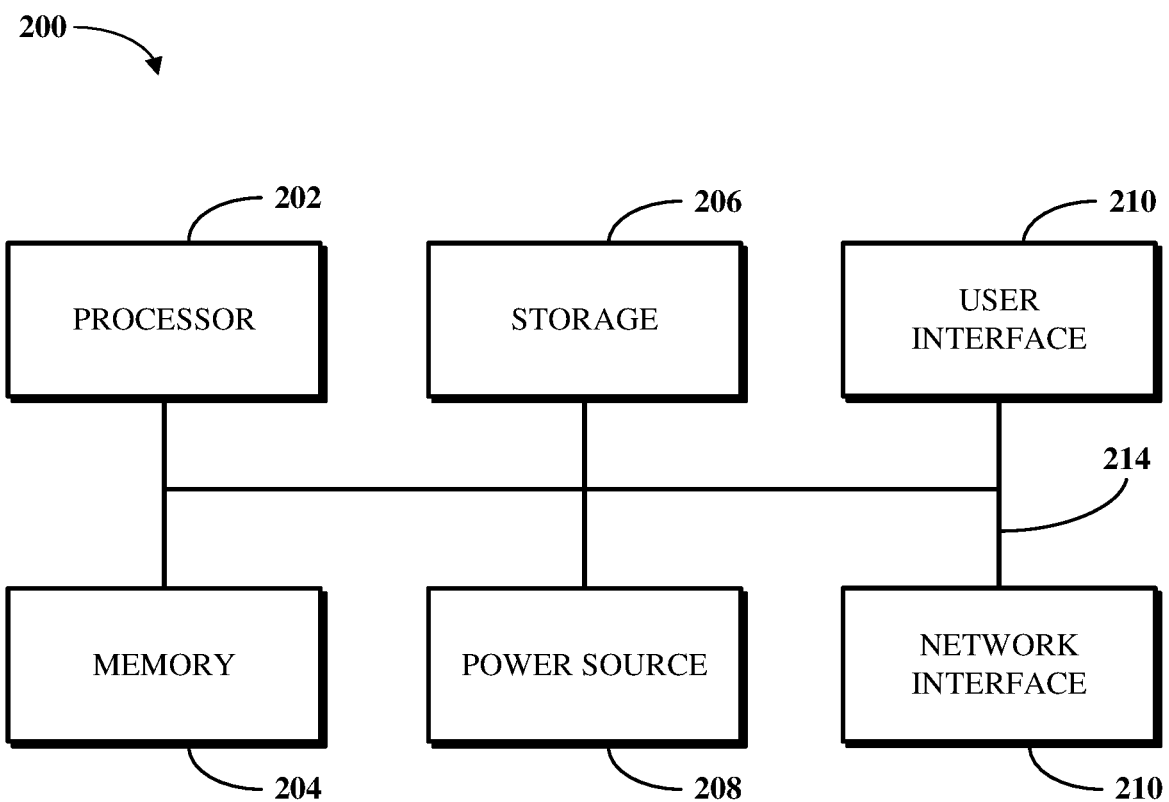
FIG. 2 is a block diagram of an example of a computing device used with a web platform system.

FIG. 2 is a block diagram of an example of a computing device 200 used with a web platform system, for example, the web platform system 100 shown in FIG. 1. The computing device 200 may, for example, be or be used to implement one or more of the web server 104, the application server 106, the database server 108, or the user device 110, all as shown in FIG. 1. The computing device 200 includes a processor 202, a memory 204, a storage 206, a power source 208, a user interface 210, and a network interface 212, all connected via a bus 214.

The processor 202 is a central processing unit, such as a microprocessor, having one or more processing cores. In some cases, the processor 202 can include another type of device, or multiple devices of one or more types, configured for manipulating or processing information. For example, operations performed by the processor 202 can be distributed across multiple devices that can be coupled directly (e.g., via a hardwired connection) or across a local area or other suitable type of network (e.g., via a networked connection). The processor 202 can include a cache for local storage of operating data or instructions.

The memory 204 includes one or more volatile memory components, such as random access memory (RAM), for example, static RAM (SRAM) and/or dynamic RAM (DRAM). In some cases, the memory 204 can represent a portion of memory distributed across multiple devices. In such a case, the memory 204 can include network-based memory or memory in multiple computing devices (e.g., in client-server or other arrangements) performing the operations of those multiple computing devices. The memory 204 includes operating data or instructions for immediate access by the processor 202. In one example, the memory 204 can include executable instructions corresponding to one or more application programs, which instructions can be loaded or copied, in whole or in part, from the storage 206 to the memory 204 to be executed by the processor 202, such as for performing some or all of the techniques of this disclosure. In another example, the memory 204 can include application data, such as user data, database data, functional program data, or the like. In yet another example, the memory 204 can include an operating system, for example, Microsoft Windows®, Mac OS X®, or Linux®, an operating system for a mobile device (e.g., a smartphone or tablet device), or an operating system for a non-mobile device (e.g., a mainframe computer).

The storage 206 includes one or more non-volatile memory components, such as a disk drive, a solid state drive, flash memory, or phase-change memory. The storage 206 stores operating data or instructions to be loaded or copied, in whole or in part, into the memory 204 to be executed by the processor 202. In some cases, the storage 206 can represent a portion of storage distributed across multiple devices. In such a case, the storage 206 can include network-based storage or storage in multiple computing devices (e.g., in client-server or other arrangements) performing the operations of those multiple computing devices.

The power source 208 delivers power to other components of the computing device 200. The power source 208 may, for example, be an interface (e.g., a power cable port) to an external power distribution system or a battery. In some cases, the power source 208 may include multiple power sources. For example, one of the multiple power sources can be a backup battery.

The user interface 210 includes one or more input interfaces and/or one or more output interfaces. An input interface may, for example, be a positional input device (e.g., a mouse, touchpad, or touchscreen), a keyboard, an audio input device (e.g., a microphone), or another suitable human or machine interface device. An output interface may, for example, be a display (e.g., a liquid crystal display, a cathode-ray tube, a light emitting diode display, or another suitable display) an audio output device (e.g., a speaker), or another suitable human or machine interface device.

The network interface 212 includes a wired network interface or a wireless network interface for interfacing with (i.e., connecting to) a network (e.g., the network 116 shown in FIG. 1). The network interface 212 enables the computing device 200 to communicate with other devices using one or more network protocols, for example, ethernet, transmission control protocol (TCP), internet protocol (IP), power line communication, an IEEE 802.X protocol (e.g., Wi-Fi, Bluetooth, or ZigBee), general packet radio service (GPRS), global system for mobile communications (GSM), code-division multiple access (CDMA), Z-Wave, another protocol, or a combination thereof.

Figure 3:
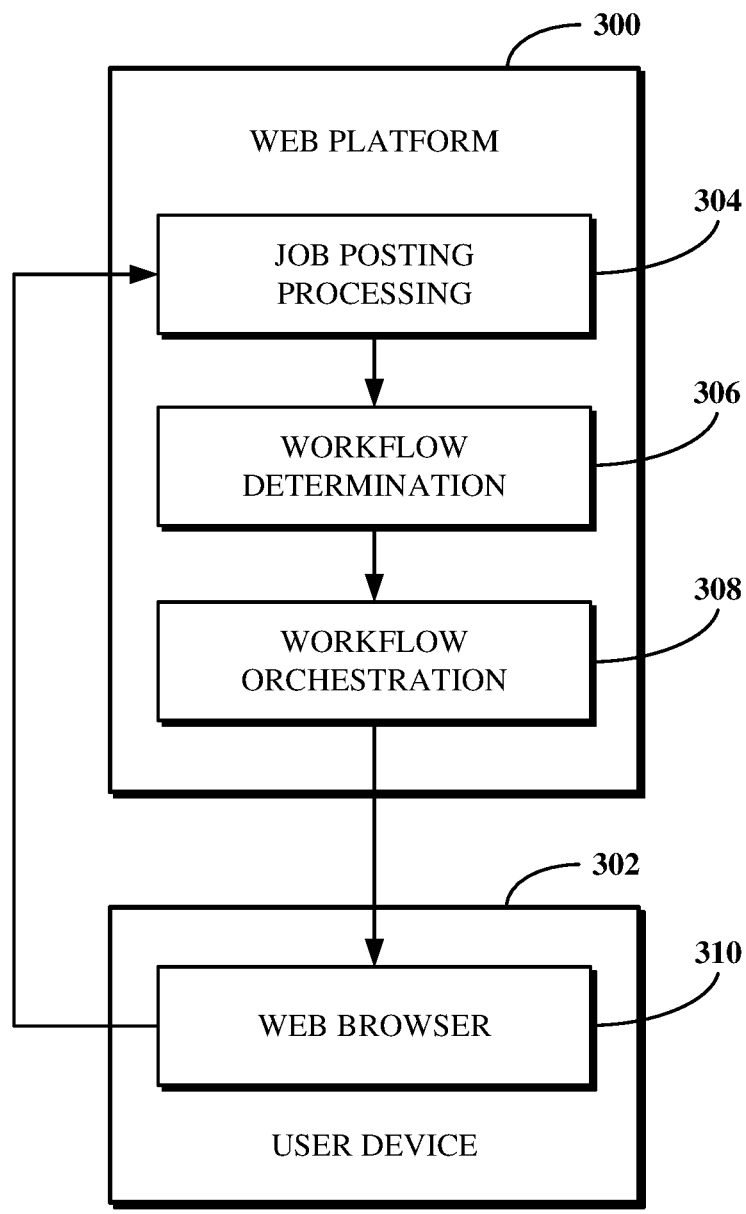
FIG. 3 is a block diagram of an example of a web platform that hosts job postings.

FIG. 3 is a block diagram of an example of a web platform 300 that hosts job postings. The web platform 300, which may, for example, be the web platform 102 shown in FIG. 1, is a software platform associated with a job posting website. A user of a user device 302, which may, for example, be the user device 110 shown in FIG. 1, may access the web platform 300 to, amongst other things, create and prepare workflows for job postings. Such functionality of the web platform 300 is provided by way of various software which may, for example, be implemented using the application server 106 shown in FIG. 1. As shown, the software includes or otherwise relate to job posting processing software 304, workflow determination software 306, and workflow orchestration software 308. The software 304 through 308 includes tools, such as programs, subprograms, functions, routines, subroutines, operations, and/or the like for the centralized orchestration of workflow component executions across software services in connection with job postings created at the web platform 300.

The job posting processing software 304 generates and/or publishes job postings for hosting at the web platform 300 based on input obtained from one or more sources. The one or more sources may, for example, include one or more of the user device 302, an intermediary system (e.g., the intermediary system 112 shown in FIG. 1), or an external source (e.g., the external source 114 shown in FIG. 1). Job postings generated and/or published using the job posting processing software 304 may then be searched for by users of the web platform 300. For example, search queries obtained from devices of job seekers using the web platform 300 (e.g., the user device 302) may be processed against a corpus of the web platform 300 to identify job postings corresponding to those search queries. Content of the resulting job postings may then be served to the user device 302, such as within a graphical user interface (GUI) of the web platform 300 output for rendering within a web browser 310 running at the user device 302.

The workflow determination software 306 determines a workflow for a job posting generated and/or published by the job posting processing software 304. The workflow is a set of workflow components that may be executed in one or more different orders. In one particular but non-limiting example, a workflow may be or otherwise correspond to a hiring process for a job posting hosted by the web platform 302 and the workflow components of the workflow may be or otherwise corresponding to steps of that hiring process. The workflow determination software 306 determines the workflow for a job posting based on input obtained from the user device 402. The input includes definitions of workflow components and/or attributes relevant to the job posting. For example, the input may be solicited via a GUI of a web form transmitted to the user device 402 in connection with the generation and/or publication of the subject job posting. In such a case, upon the generation and/or publication of the subject job posting, the user of the user device 402 may specify details for the workflow, such as software services to use to perform individual workflow components thereof, attributes and values thereof that are preferred or required to satisfy one or more of those workflow components, and/or the like.

Determining the workflow thus includes identifying one or more software services to use to perform the various workflow components. The software services are identified based on the input (e.g., from the user device 302) used to determine workflow. For example, input indicating or otherwise defining a workflow component can in some cases specify a software service to use to execute that workflow component (e.g., where the workflow component corresponds to scheduling an interview and the input indicates to use Calendly to schedule the interview, Calendly can be identified as the software service). In another example, the workflow determination software 306 may determine the software service to use to execute a workflow component based on information associated with the workflow component in the absence of a specific software service being indicated (e.g., where the workflow component corresponds to scheduling an interview and the input does not indicate a specific software or platform to use to do so, the workflow determination software 306 can infer to use a software service known for scheduling and either present one such software service for confirmation by the user of the user device 302 or present multiple such software services for selection by that user.

The workflow determination software 306 determines attributes associated with the workflow components. Generally, the attributes associated with a workflow component include or otherwise refer to a set of information required to satisfy (e.g., complete an execution of) the workflow component. For example, the attributes required for an application review workflow component may include a name, location, skill, and work history of the job seeker. In another example, the attributes required for an interview scheduling workflow component may include a name of the job seeker, contact information for the job seeker, and a date and time at which the schedule the interview. Where the input used to determine the workflow includes or otherwise identifies attributes for a given workflow component, that input can be used to determine the attributes therefor. However, where the input omits such attributes, or where the attributes are indicated within the input other than with specific association to a particular workflow component, the workflow determination software 306 processes the job posting to determine attributes for the workflow components.

For example, the workflow determination software 306 may determine the attributes for a given workflow component based on attributes commonly associated with a category or type of the workflow component (e.g., a step of the hiring process to which the workflow component corresponds). In another example, the workflow determination software 306 may determine the attributes for a given workflow component by probing a software service identified for use for executing the workflow component (e.g., using an API call to identify the inputs required for that particular software service). Such examples may be considered to machine-derive the attributes. While some attributes may only be associated with a single workflow component, some attributes may be associated with two or more workflow components. In some cases, the workflow determination software 306 may produce a list or map of workflow components with which a given attribute is associated to easily recognize which workflow components can use which attributes.

The workflow determination software 306 then generates, for the workflow, instructions in a DSL, also referred to herein as DSL instructions, according to the workflow components and attributes thereof. The DSL instructions, when executed, are configured to cause a subject software service used for the execution of a given workflow component to execute that given workflow component (e.g., initiate the step of the hiring process corresponding to that given workflow component). The DSL instructions may be considered to include multiple DSL instructions in which each of the multiple DSL instructions corresponds to a different workflow component. For example, where a workflow includes a first workflow component to execute using a first software service and a second workflow component to execute using a second software service, the DSL instructions may include first instructions to execute to cause the first software service to execute the first workflow component and second instructions to execute to cause the second software service to execute the second workflow component. The DSL instructions for the various workflow components may be generated at the same time (e.g., after all workflow components and their respective software services are identified) or at different times (e.g., individually, such as upon identification of a workflow component and its software service). The DSL instructions may be expressed using one or more formats. In one non-limiting example, the DSL instructions may be expressed using JavaScript Object Notation (JSON).

Generating the DSL instructions for the workflow can include compiling the DSL instructions for the workflow components thereof. Generating the DSL instructions for a workflow component can include converting a data set corresponding to the workflow component into the format used for the DSL instructions (e.g., JSON). For example, a conversion tool may translate input derived from the user device 302 and/or other information associated therewith (e.g., machine-derived attributes) in a plain-language text format into the format for the DSL instructions by recognizing element types of that input and/or other information (e.g., an identifier representing the function of the workflow component, an identifier of the software service to use, indications of actors who will perform various tasks in connection with the workflow component, and/or identifiers of pre-actions or post-actions for the workflow component). Where an attribute is shared by or otherwise used with multiple workflow components (e.g., as indicated within a list or map of workflow components that are associated with the attribute), the DSL instructions for each of those workflow components may indicate the attribute. The DSL instructions for those workflow components may list the same or different preconditions (e.g., threshold values) for such a shared attribute.

The DSL instructions generated for the workflow may then be stored in a data store accessible to the web platform 300 for later processing of the workflow. For example, the workflow may be determined at a first time relative to a generation and/or publication of a subject job posting hosted by the web platform 300, while the workflow may be later processed by the invocation of DSL instructions thereof at a second time relative to an interaction by a job seeker with the job posting at the web platform 300.

In some implementations, the workflow may be determined using a machine learning model trained to predict workflow components and/or attributes based on information associated with a subject job posting. A machine learning model as used herein may be one or more of a neural network (e.g., a convolutional neural network, recurrent neural network, or other neural network), decision tree, vector machine, Bayesian network, genetic algorithm, deep learning system separate from a neural network, or other machine learning model. The machine learning model may be supervised or unsupervised. The machine learning model applies intelligence to identify complex patterns in the input and to leverage those patterns to produce output and refine systemic understanding of how to determine workflows for job postings hosted by the web platform 300. For example, the web platform 300 may include functionality for training the machine learning model using a training data set indicating job postings hosted by the web platform and workflow components used for workflows therefor. Training the machine learning model in this way can include causing a recognition of a pattern between the types of workflow components used for certain types of job postings.

In some implementations, the workflow may be determined using a template. For example, the web platform 300 can collect data over time to determine workflow contents (i.e., workflow components and attributes thereof) which are effective for specific types of job postings. In one particular example, the web platform 300 may aggregate statistics for hundreds of workflows for job postings in the education space, including workflows determined based on manual input received from user devices such as the user device 302, to determine a template specific to education, which includes application review, academic and credential verification, past district reference review, background check, interview scheduling, and school walkthrough. In some such implementations, the user of the user device 302, upon selecting to use such a template, may be presented with options for modifying the template to more closely align with requirements specific to a subject job posting. In this way, the templates may serve as starting points for workflow determination.

The workflow orchestration software 308 centrally orchestrates the execution of workflow components of a workflow determined using the workflow determination software 306. In particular, the workflow orchestration software 308 obtains the DSL instructions generated for the workflow (e.g., from a data store or directly from the workflow determination software 306) and invokes the DSL instructions to cause executions of workflow components by the software services identified for those workflow components. In that the input for some workflow components may be or be derived from the output of other workflow components, the workflow orchestration software 308 may monitor the output of workflow components under execution and/or for which execution has completed to determine one or more remaining workflow components of the workflow to next cause to execute.

For example, the workflow orchestration software 308 can invoke first DSL instructions to cause a first software service to execute a first workflow component. While that first workflow component executes, the workflow orchestration software 308 obtains an output of the first workflow component (e.g., from the first software service). The workflow orchestration software 308 determines that the output of the first workflow component corresponds to an attribute identified as a prerequisite for a second workflow component (e.g., based on a prior mapping or listing of shared attributes or based on a search through the DSL instructions for other workflow components associated with the attribute). Based on that output, as well as a determination that other prerequisites for the second workflow component are satisfied, the workflow orchestration software 308 can invoke second DSL instructions to cause a second software service to execute the second workflow component.

In some cases, the workflow orchestration software 308 may cause multiple workflow components to simultaneously execute. For example, second and third DSL instructions can be invoked to cause second and third workflow components, respectively, to simultaneously execute. This unconstrained invocation of DSL instruction enables a more efficient progression through the workflow than if the workflow were limited to a funnel or like sequence form.

Invoking the DSL instructions for a workflow component includes executing those DSL instructions to produce instructions suitable for processing by the software service associated with the workflow component. The instructions suitable for processing by the software service may be in a format different from the format in which the DSL instructions are expressed. As such, producing the instructions suitable for processing by the software service can include translating or otherwise interpreting the DSL instructions from a first format to a second format. In some cases, the instructions suitable for processing by the software service may not be computer instructions expressed in a programming, scripting, or other code or machine language. For example, the instructions produced by executing the DSL instructions may instead be or include commands, API calls, or the like configured for processing by the software service.

The orchestration of the execution of the workflow components being central refers to use of a single entity (i.e., an orchestration system, as disclosed herein) for orchestrating, or causing, the execution of the workflow components rather than relying upon disparate software services identified for the workflow components to execute same, such as in a funnel or like defined sequence. Thus, and regardless of the timing for specific portions thereof, the DSL instructions are entirely invoked by that single entity. Centrally orchestrating workflow component executions in this way enables improved visibility into the progress of various workflow components under execution and improved monitoring for prerequisites to the execution of remaining workflow components (e.g., attributes).

Figure 4:
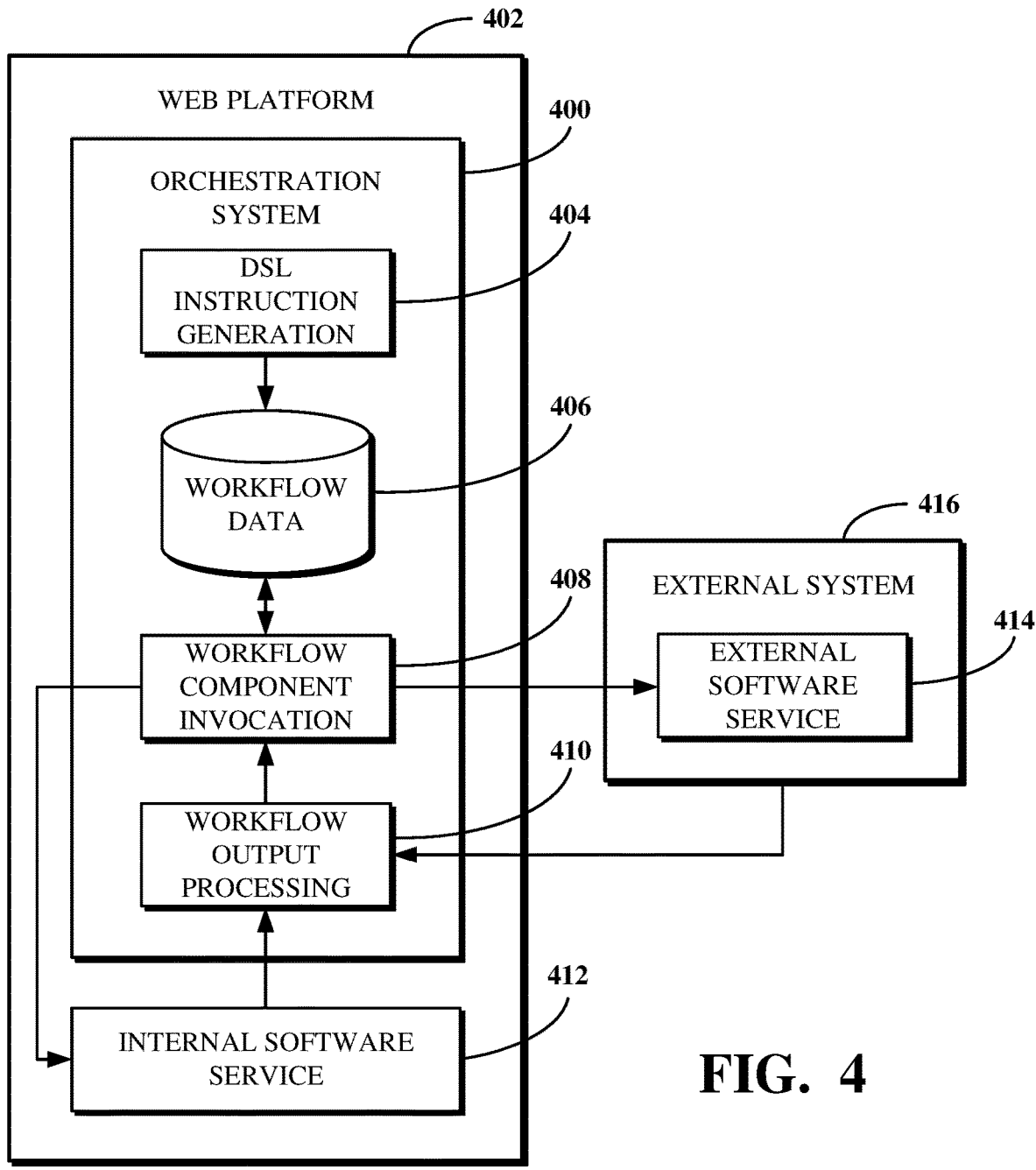
FIG. 4 is a block diagram of an example of an orchestration system for centralized orchestration of workflow component executions across software services.

FIG. 4 is a block diagram of an example of an orchestration system 400 for centralized orchestration of workflow component executions across software services. The orchestration system 400 is or otherwise includes hardware and/or software for determining a workflow associated with a job posting hosted by a web platform 402 (e.g., the web platform 300 shown in FIG. 3) and for invoking DSL instructions associated with that workflow to cause workflow components of the workflow to execute. In particular, the orchestration system 400 is or includes backend software configured to orchestrate execution of workflow components of a workflow associated with a job posting. For example, the orchestration system 400 can include or otherwise implement the functionality of the workflow determination software 306 and the workflow orchestration software 308 shown in FIG. 3. The orchestration system 400 as shown includes a DSL instruction generation tool 404, a workflow data datastore 406, a workflow component invocation tool 408, and a workflow output processing tool 410. While shown as being internal to the orchestration system 100, in some implementations, one or more of the aspects 404 through 410 may be external to the orchestration system 400.

The DSL instruction generation tool 404 generates DSL instructions for the workflow based on workflow components and attributes identified for the workflow. As described above with respect to FIG. 3, the DSL instructions generally are generated as part of the process for determining the workflow. However, in some implementations, the DSL instruction generation tool 404 can use the output of a workflow determination tool (e.g., the workflow determination software 306) to generate DSL instructions for the subject workflow. The output of the DSL instruction generation tool 404 is a set of DSL instructions covering each of the workflow components of the workflow. That output is stored in the workflow data datastore 406.

Later, when the workflow is triggered to begin (e.g., based on a receipt at the web platform of an application for the job posting associated with the workflow by a job seeker), the workflow component invocation tool 408 accesses the workflow data datastore 406 to obtain the DSL instructions for some or all of the workflow. In some cases, the workflow component invocation tool 408 obtains all of the DSL instructions for the workflow at a start of the workflow. In other cases, the workflow component invocation tool 408 obtains portions of the DSL instructions corresponding to individual workflow components upon a determination to invoke those portions of the DSL instructions.

As described above with respect to FIG. 4, the workflow component invocation tool 408 invokes DSL instructions for a workflow component by executing those DSL instructions to produce instructions suitable for processing by a software service used for the workflow component. The software service may be an internal software service 412 of the web platform 402 or an external software service 414 of an external system 416 separate from the web platform 402. One non-limiting example of the internal software service 412 is application screening, in which the web platform 400 natively includes functionality for screening the application from a job seeker for a subject job posting. One non-limiting example of the external software service 414 is interview scheduling, in which the web platform 400 does not include native functionality for enabling the job seeker and the job poster to schedule an interview between themselves and thus the workflow requires access to and use of the external system 416 which does have such interview scheduling functionality. Given the variance between native functionality of web platforms, a given software service may be an internal software service for one web platform but an external software service of another platform. Although one internal software service 412 and one external software service 414 are shown by example, other numbers of internal software services and/or external software services may be used.

Access by the orchestration system 400 (e.g., via the workflow component invocation tool 408) to the internal software service 412 or to the external software service 414 is by way of an API call (or set of such calls) and/or use of a web browser plugin Each software service may require its own API or plugin. A plugin for a software service may, for example, use HTTP calls via an API implemented by the plugin. In some cases, where one or more plugins are required to access a software service to execute a workflow component, the orchestration system 400 can cause a user device of a job seeker or of another user of the web platform 402 who is participating in the workflow to install each such plugin prior to or during the workflow being initiated. In some cases, the orchestration 400 or another aspect of the web platform 402 may maintain a library of plugins for various software services, and the plugins required for a given workflow can be accessed and installed, as appropriate, from that library.

The workflow output processing tool 410 obtains an output of a workflow component from the software service used to execute that workflow component (i.e., the internal software service 412 or the external software service 414). The output indicates some processing result by the software service in connection with the workflow component. In particular, the output may include or otherwise be a value of one or more attributes associated with the workflow component. For example, and because the workflow components operate to fulfill requirements for the workflow (e.g., steps of a hiring process for a job posting), the output may include values of one or more attributes usable to determine whether the subject workflow component is satisfied. The quality of a workflow component being satisfied refers to the output thereof satisfying or otherwise meeting some threshold required therefor. For example, where an attribute corresponding to a number of years of experience in a given work field is equal to or above a minimum number of years defined by the web platform user whose input was used to determine the workflow (e.g., the user of the user device 302), the workflow component associated with the output including that attribute value may be considered to be satisfied, and progress toward completion of the workflow is made based on such satisfaction. However, where that attribute is instead less than that minimum number of years, the workflow component may be considered to be unsatisfied, and progress toward the completion of the workflow may be delayed or the workflow may instead be terminated.

In particular, the workflow output processing tool 410 can process the output of a workflow component obtained from the software service used to identify a workflow termination condition. A workflow termination condition is or otherwise refers to something that indicates that the subject workflow should terminate (e.g., that the job seeker being evaluated by the workflow should be denied for the subject job posting). A workflow termination condition may, for example, be a value of an attribute not satisfying a requirement for completing a workflow component or an amount of time the workflow has remained in progress exceeding a threshold. In response to a workflow termination condition, the workflow output processing tool 410 signals the workflow termination condition or an indication thereof to the workflow component invocation tool 408. The workflow component invocation tool 408 limits the invocation of DSL instructions for remaining workflow components based on that signal from the workflow output processing tool 410. In some cases, the workflow component invocation tool 408 may also terminate or cause the termination of in-progress workflow component executions based on the signal from the workflow output processing tool. In some cases, the workflow component invocation tool 408 or another aspect of the orchestration system 400 can store data indicative of the workflow termination within the workflow data datastore 406. For example, in the event the same job seeker later re-applies for the subject job posting, the data indicative of the earlier workflow termination may be reported to limit the further progress of that re-application.

In some implementations, the orchestration system 400 can monitor the progress of workflow components under execution and alert a user of the web platform 402 when any such workflow component has not been completed within a threshold or otherwise defined time period. For example, a job poster as a user of the web platform 402 may define a time limit for a job seeker to go through the workflow (e.g., one week), and the job poster may thus receive an alert in some form when an amount of time during which the workflow has remained in progress for a job seeker has exceeded that time limit. In some such implementations, the orchestration system 400 or another aspect of the web platform 402 may indicate such alerted workflow components to a user of the web platform 402. For example, the user may determine to modify the workflow prior to a completion thereof by a given job seeker to remove certain attributes required by an alerted workflow component or to simply remove such an alerted workflow component from the workflow altogether, such as where the user deems same less important than the ultimate completion of the workflow by the job seeker.

In some implementations, and subject to permissions granted to the web platform 402, data indicative of some or all attributes obtained for a job seeker user of the web platform 402 via the processing of a workflow may persist within one or more data stores (not shown). The data, or a portion of same, may accordingly be re-used with future job postings applied to by the job seeker user and hosted by the web platform 402. For example, where a workflow for a similar job posting is later determined, the stored attribute data for a job seeker user of the web platform 402 who applies to that similar job posting may be automatically populated in appropriate fields and/or forms of one or more software services associated with that workflow. To prevent stale data from being re-used on future jobs, a time-to-live policy may be enforced against this data.

An example use case in which the orchestration system 400 centrally orchestrates the execution of workflow components for a workflow associated with a job posting hosted by the web platform 402 will now be described. A representative of a software development company logs into an account for the company at the web platform 402. The representative, as the job poster user of the web platform per this example use case, interacts with one or more forms within the web platform 402 to cause the web platform 402 to generate a job posting for a new software developer position to be fulfilled on behalf of the company. The input presented within those one or more forms specifies a title of the job posting (e.g., junior backend developer), one or more skills required for the job posting (e.g., proficiency in coding in JavaScript), and a number of years of experience required for the job posting (e.g., one to three). The representative causes the job posting to publish and thus become hosted by the web platform.

In response to the generation or publication of the job posting, the representative configures a workflow for evaluating eventual applicants of the job posting. To do so, the representative selects one or more options for workflow components to include within the workflow and, for each of those workflow components, one or more attributes and values therefor that are to serve as pre-conditions and/or post-conditions respectively for initiating and/or satisfying the workflow component. For example, the representative may select to include workflow components including application screening, interview scheduling, and background check performance. The attributes for application screening include a name of the job seeker applying for the job posting, a minimum skill level of the job seeker, and a minimum number of years of experience the job seeker has. The attributes for interview scheduling include the name of the job seeker, contact information for the job seeker, and a satisfied application screening for the job seeker. The attributes for background check performance include the name of the job seeker, an address of the job seeker, and one or more references provided by the job seeker.

The orchestration system 400 processes this workflow component and attribute information to determine the workflow for the job posting, including by generating DSL instructions for each workflow component according to the attribute information therefor. When a job seeker user of the web platform later finds the job posting and applies for it, the workflow for the job posting begins, at which point DSL instructions for the first workflow component are invoked. The first workflow component is identified as the one that does not have pre-conditions, in this case, application screening. The invocation of the DSL instructions causes an internal software service (e.g., the internal software service 412) to execute the application screening. For example, the application screening execution can include a processing of the application from the job seeker user against the job posting requirements to determine whether the job seeker meets the criteria required for the job posting.

The orchestration system 500 obtains an output of the application screening from the internal software service. The orchestration system 500 searches for other workflow components which reference one or more of the attributes for which values are included or otherwise indicated within the output of the application screening. Here, the pre-conditions including the attributes specified for both of the interview scheduling and the background check performance are all met, and so the orchestration system 500 proceeds to invoke the DSL instructions for both of those workflow components. The orchestration system 500 can invoke those DSL instructions simultaneously or one after another. In one hypothetical end point, the DSL instructions for the interview scheduling are invoked to cause an external software service (e.g., the external software service 414) to execute an interview scheduling process, but a time limit defined for the workflow is reached before the interview is scheduled. In this case, the workflow may be terminated based on the identification of a workflow termination condition related to the timing of the workflow remaining in progress. In another hypothetical end point, the DSL instructions for both of the interview scheduling and the background check performance are invoked to cause separate software services therefor to execute those workflow components, and satisfactory output is ultimately obtained for each. In this case, the workflow may complete and the job seeker user may accordingly be informed as to whether or not their application was successful.

Figure 5:
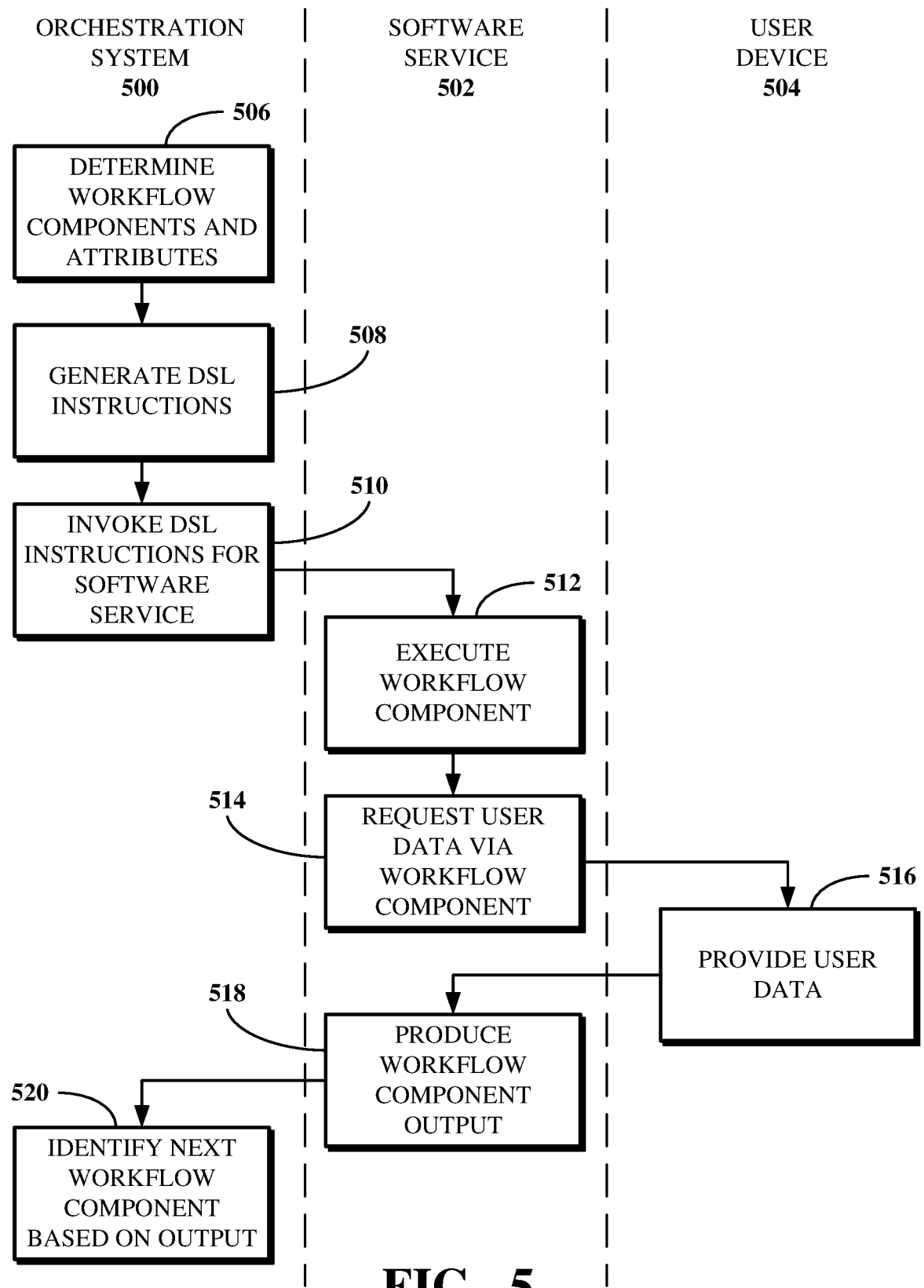
FIG. 5 is a swim lane diagram of an example sequence of operations performed for the centralized orchestration of workflow component executions across software services.

FIG. 5 is a swim lane diagram of an example sequence of operations performed for the centralized orchestration of workflow component executions across software services.

The sequence of operations is described as being between an orchestration system 500, a software service 502, and a user device 504. The orchestration system 500 may, for example, be the orchestration system 400 shown in FIG. 4. The software service 502 may, for example, be one of the internal software service 412 or the external software service 414 shown in FIG. 4. The user device 504 may, for example, be the user device 302 shown in FIG. 3.

At 506, workflow components and attributes for those workflow components are determined using the orchestration system 500, such as based on input obtained from the user device 504 and/or derived from a machine process (e.g., using a machine learning model trained for determining workflow components and attributes for a workflow based on contextual recognition of job posting data) At 508, DSL instructions are generated for the workflow components and based on the attributes at the orchestration system 500. At 510, the DSL instructions for a current workflow component are invoked by the orchestration system 500 to cause a software service associated with the current workflow component (i.e., the software service 502) to execute the current workflow component.

At 512, the software service 502 executes the workflow component based on the invocation of the DSL instructions therefor by the orchestration system 500. At 514, as part of the execution of the workflow component or otherwise while the workflow component executes, user data is requested via the workflow component by the software service 502 transmitting the request or otherwise presenting a GUI associated therewith to the user device 504. At 516, the user data is provided by the user device 504 to the software service 502 in response to the request from the software service 502. At 518, output of the workflow component is produced by the software service 502. At 520, the orchestration system 500 obtains the output of the workflow component from the software service 502 and determines a next workflow component to cause the execution of based on values of one or more attributes indicated within the output. The process repeats until the workflow completes or is terminated.

FIG. 6 is an illustration of an example of a GUI 600 for determining a workflow for a job posting hosted by a web platform, for example, the web platform 300 shown in FIG. 3 or the web platform 402 shown in FIG. 4, to the extent different. In particular, the GUI 600 is presented for display at a user device (e.g., the user device 302 shown in FIG. 3) in connection with the determination of a workflow for a job posting and thus prior to an initiation of the workflow for a given job seeker who applies for the job posting.

The GUI 600 is used to obtain input from the user of the user device to determine workflow components for the workflow and attributes for ones of those workflow components. The GUI 600, as shown, includes a first field corresponding to workflow components and a second field corresponding to attributes. The first field and the second field each include checkboxes for various options that may be selected by the user. For example, as shown, the first field includes options for workflow components including application screening, interview scheduling, post-interview assessment, and a background check, and the second field includes options for a minimum number of years of experience, a willingness to work at an office or in a hybrid approach, a desire for full-time work, and a desire for references.

The GUI 600 is one example of a GUI which may be presented to a user device for determining a workflow at the web platform. One other example of a GUI presented to a user device for determining a workflow at the web platform may include one or more free-form text fields configured to receive free-form text input from the user device. For example, a first text field may ask the user of the user device to describe tasks that they would like to have performed as part of the workflow, and a second text field may ask the user to describe attributes of a successful job seeker candidate applying for the subject job posting. Yet another example of a GUI presented to a user device for determining a workflow at the web platform may include a first section within which a user of the user device may specify workflow components to include in the workflow and a second section that will change for each of those workflow components to show options, based on patterns recognized by the orchestration system, of attributes that the user may selectively attach to a given workflow component. Other examples are possible.

Figure 7:
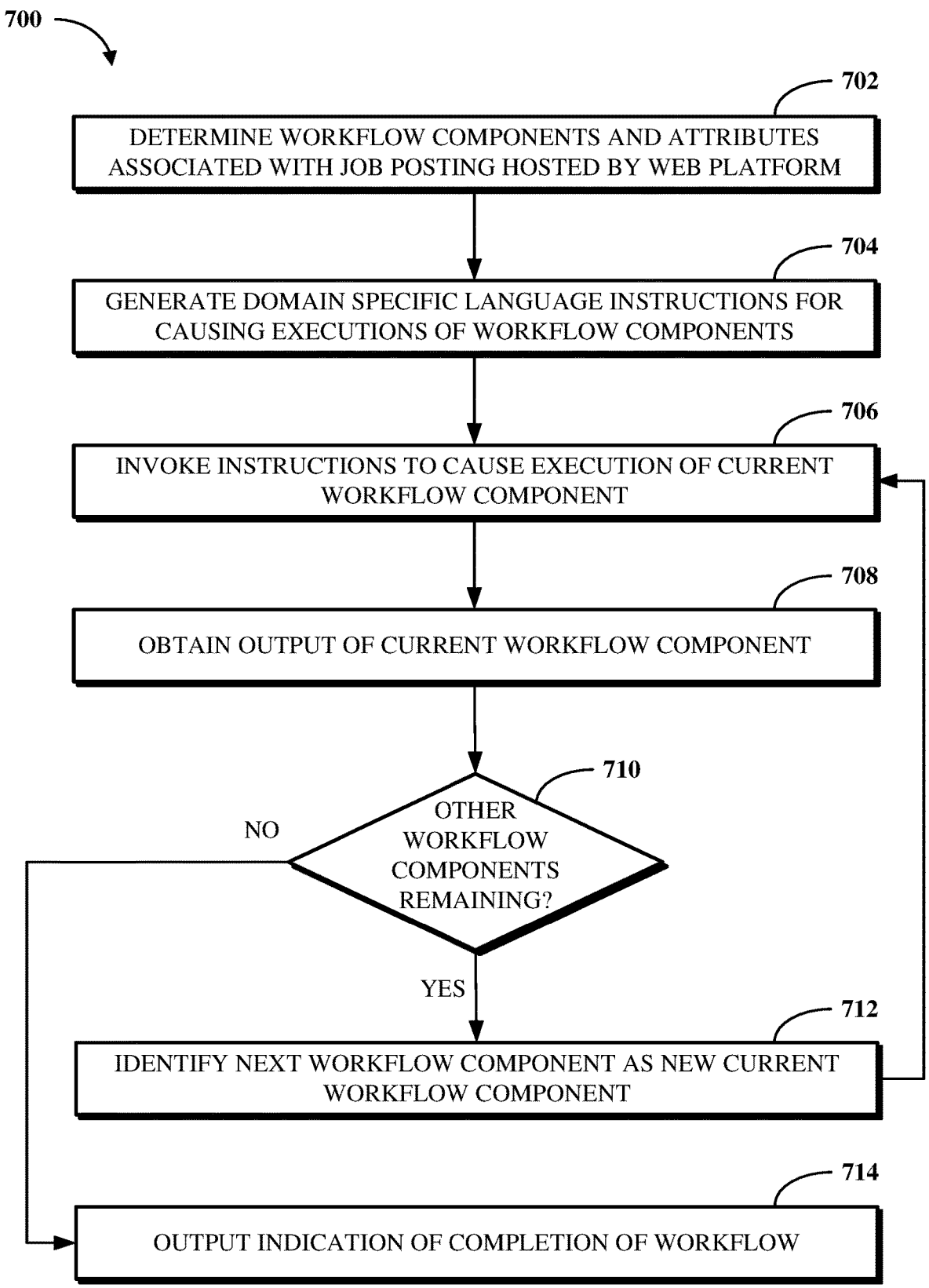
FIG. 7 is a flowchart of an example of a technique for centralized orchestration of workflow component executions across software services.

To further describe some implementations in greater detail, reference is next made to examples of techniques which may be performed by or using a system for centralized orchestration of workflow component executions across software services. FIG. 7 is a flowchart of an example of a technique 700 for centralized orchestration of workflow component executions across software services. The technique 700 can be executed using computing devices, such as the systems, hardware, and software described with respect to FIGS. 1-6. The technique 700 can be performed, for example, by executing a machine-readable program or other computer-executable instructions, such as routines, instructions, programs, or other code. The steps, or operations, of the technique 700 or another technique, method, process, or algorithm described in connection with the implementations disclosed herein can be implemented directly in hardware, firmware, software executed by hardware, circuitry, or a combination thereof.

For simplicity of explanation, the technique 700 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 702, workflow components and attributes corresponding to those workflow components are determined. The workflow components and attributes are associated with a job posting hosted by a web platform. The workflow components may, for example, be, include, or otherwise refer to tasks to perform as steps of a hiring process in connection with the job posting. In some cases, the workflow components and/or attributes are determined using input obtained from a user device of a job poster who causes the subject job posting to be generated and/or published by the web platform. For example, a GUI including options for workflow components to include in the workflow may be presented to a user device accessing the web platform. The workflow components, and thus the eventual workflow, may accordingly be determined based on a selection of one or more of those options via the GUI. In some cases, the workflow components and/or attributes are determined via a machine-derived process, for example, using a trained machine learning model that inferences against data associated with the job posting.

In some implementations, where a GUI including options for workflow components is presented to a user device, the options presented within the GUI may be presented for the subject job posting based on a template associated with the job posting. The template may be determined specifically for the job posting to indicate workflow components commonly used for job postings similar to (e.g., within a same category, industry, or vertical as) the subject job posting. For example, the template may be determined by aggregating selections of workflow component options for multiple job postings over time.

At 704, DSL instructions for the workflow are generated for causing executions of the workflow components by software services associated with those workflow components. The DSL instructions for a given workflow component are generated according to the attributes associated with that workflow component. For example, where a workflow component corresponds to application screening and the attributes therefor include a job seeker name and a job seeker skill, the DSL instructions for the workflow component are generated to require a job seeker name and a job seeker skill to be provided in connection with the eventual execution of that workflow component for a job seeker user of the web platform. The DSL instructions for a given workflow component may identify one or more domain objects specific to the software service to use for executing that workflow component. For example, such a domain object may be a variable or other element required by, involved in, or otherwise used in connection with the software service.

Determining the workflow components and attributes and using same to generate the DSL instructions may in at least some cases be considered as a single operation for set thereof for determining a workflow associated with a job posting hosted by the web platform.

At 706, DSL instructions for a current workflow component (e.g., the first workflow component, if no prior workflow components have been executed) are invoked to cause an execution of that current workflow component by the software service associated therewith. Invoking DSL instructions to cause the execution of a workflow component includes executing the DSL instructions to produce instructions suitable for processing by the software service used for the workflow component execution. The software service may be internal or external to the software platform. For example, where the software service is external to the web platform, invoking the DSL instructions for the workflow component can include communicating with the software service external to the web platform using a plug in component installed for use with the software service.

At 708, output of the current workflow component is obtained from the software service used for the current workflow component. The output may, for example, include or otherwise indicate values of one or more attributes associated with the current workflow component. For example, the values of those one or more attributes may be obtained from a user device interacting with the software service used for the current workflow component. In some cases, the output of the current workflow component is obtained prior to a completion of the current workflow component. In some cases, the output of the current workflow component is obtained after (e.g., in response to) a completion of the current workflow component.

In some implementations, the output of the current workflow component obtained from the software service used therefor may be used to map attribute data to one or more elements of another workflow component. For example, attribute data obtained within an output of a first workflow component may be mapped to one or more elements of a second workflow component. This mapping may be performed to prevent a further collection of the attribute data by the second workflow component, such as by causing an eventual invocation of DSL instructions for the second workflow component to omit or automatically populate a field, form, or like element within which a user may have otherwise input the same attribute data. As such, where the execution of the first workflow component causes a presentation, to a user device accessing the web platform, of a first web form configured for collecting a user data element and the execution of the second workflow component causes a presentation, to the user device, of a web second form configured for collecting the user data element, the mapping may enable an automated population within the second field of a subject user data element collected from within the first web form.

At 710, a determination is made as to whether there are other workflow components remaining for execution in connection with the workflow. Determining whether there are other workflow components remaining for execution in connection with the workflow can include determining whether an output has been obtained for each workflow component of the workflow, in which no workflow components remain where an output has been obtained for each such workflow component and at least one workflow component is inferred to remain where an output has not been obtained for each such workflow component.

At 712, responsive to a determination that there are one or more other workflow components remaining for execution in connection with the workflow, the next workflow component is identified as a new current workflow component. The technique 700 then returns to 706, at which the DSL instructions for that new current workflow component are invoked to cause the execution thereof by an associated software service. The new current workflow is identified and the DSL instructions associated therewith are invoked based on a mapping of an attribute of the previous current workflow component to the new current workflow component. In particular, to determine to proceed next with the new current workflow component, a value of the attribute is identified without the output of the previous current workflow component and that same attribute is identified as also corresponding to the new current workflow component.

The relevant operations of the technique 700 may repeat until there are no other workflow components remaining for execution in connection with the workflow. For example, where the previous current workflow component is a first workflow component and the next current workflow component is a second workflow component, output of the second workflow component may be obtained from the software service used for the second workflow component. That output may be processed to identify a third workflow component, and DSL instructions for that third workflow component may accordingly be invoked to cause the software service used therefor to execute the third workflow component.

At 714, responsive to a determination that there are not one or more other workflow components remaining for execution in connection with the workflow, an indication of a completion of the workflow is output. For example, the indication of the completion of the workflow may be output to a first user device associated with a job seeker user of the web platform who applied for the subject job posting and to a second user device associated with a job poster user of the web platform who caused the subject job posting to be generated and/or published at the web platform. The indication of the completion of the workflow serves as an end of the workflow, in which a decision to hire or not hire the job seeker is reached.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, Python, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "component" and "aspect" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an application-specific integrated circuit (ASIC)), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of this disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media (e.g., as a non-transitory computer readable medium storing instructions operable to cause one or more processors to perform operations), and can include volatile memory or non-volatile memory that can change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
   determining, using an orchestration system of a web platform and configured to orchestrate execution of workflow components using software services of the web platform, a workflow associated with content hosted by the web platform;
   simultaneously generating first and second instructions in a domain-specific language by converting input of the workflow into the domain-specific language, wherein the first instructions express elements of a first workflow component of the workflow as first attributes available to a first software service external to the web platform and the second instructions express elements of a second workflow component of the workflow as second attributes available to a second software service internal to the web platform;
   causing, by the orchestration system, a user device accessing the web platform to install a first web browser plugin associated with the first software service and a second web browser plugin associated with the second software service;
   simultaneously causing, by the orchestration system via the installed first web browser plugin and the installed second web browser plugin, executions of the first workflow component via the first software service and the second workflow component via the second software service by:
      invoking, by the orchestration system, the first instructions in the domain-specific language to produce, by the orchestration system, first computer instructions expressed in a first computer language other than the domain-specific language and usable to cause an execution of the first workflow component by the first software service including the first software service processing the first attributes via the first computer language; and
      invoking, by the orchestration system, the second instructions in the domain-specific language to produce, by the orchestration system, second computer instructions expressed in a second computer language other than the domain-specific language and usable to cause an execution of the second workflow component by the second software service including the second software service processing the second attributes via the second computer language;
   mapping, by the orchestration system, one or both of the first attributes or the second attributes to one or more other workflow components of the workflow to produce mapping data;
   outputting, by the orchestration system, an alert to the user device to indicate that a third workflow component of the one or more other workflow components remains under execution for more than a threshold time period; and
   storing, by the orchestration system, data indicative of the first attributes, the second attributes, and the mapping data within a data store available to the orchestration system to enable an automated population of input associated with the first attributes and the second attributes within fields associated with the first workflow component, the second workflow component, and the one or more other workflow components during future executions of the workflow according to a time-to-live policy enforced to prevent a use of stale data in connection with the future executions of the workflow.

2. The method of claim 1, wherein determining the workflow comprises:
   determining the first attributes and the second attributes, wherein the first instructions and the second instructions are generated according to the first attributes and the second attributes.

3. The method of claim 1, wherein an invocation of third instructions generated in the domain-specific language for the third workflow component is based on a mapping of an attribute of one of the first attributes or the second attributes to the third workflow component.

4. The method of claim 3, wherein the third instructions are invoked prior to a completion of the first workflow component and the second workflow component.

5. The method of claim 1, wherein determining the workflow comprises:
   presenting, to the user device, a graphical user interface including options for workflow components to include in the workflow; and
   determining the workflow based on a selection of one or more of the options via the graphical user interface.

6. The method of claim 5, wherein the content includes a job posting and the options included in the graphical user interface are presented for the job posting based on a template associated with the job posting.

7. The method of claim 6, comprising:
   aggregating selections of workflow component options for multiple job postings over time to determine the template.

8. The method of claim 1, wherein the orchestration system is internal to the web platform and the output is a first output, the method comprising:
   causing an execution of third instructions generated in the domain-specific language for the third workflow component by invoking, by the orchestration system, the third instructions in the domain-specific language to produce, by the orchestration system, third computer instructions expressed in a third computer language other than in the domain-specific language and usable to cause an execution of the third workflow component by a third software service.

9. The method of claim 1, wherein invoking the first instructions to cause the execution of the first workflow component comprises:
   executing, by the orchestration system, the first instructions to produce the first computer instructions.

10. A system, comprising:
   one or more servers configured to:
      simultaneously generate first and second instructions in a domain-specific language by converting, into the domain-specific language, input of a workflow associated with content hosted by a web platform, wherein the first instructions correspond to a first software service external to the web platform and the second instructions correspond to a second software service internal to the web platform;
      cause a user device accessing the web platform to install a first web browser plugin associated with the first software service and a second web browser plugin associated with the second software service;
      simultaneously cause, via the installed first web browser plugin and the installed second web browser plugin, executions of a first workflow component via the first software service and of a second workflow component via the second software service to:
         invoke, by backend software of the web platform and configured to orchestrate execution of workflow components of the workflow, the first instructions in the domain-specific language to produce, by the backend software, first computer instructions expressed in a first computer language other than the domain-specific language and usable to cause an execution of the workflow component by the first software service; and
         invoke, by the backend software, the second instructions in the domain-specific language to produce, by the backend software, second computer instructions expressed in a second computer language other than the domain-specific language and usable to cause an execution of the second workflow component by the second software service; and
      map attribute data obtained within output of the first workflow component and of the second workflow component to one or more elements of a third workflow component of the workflow to prevent a further collection of the attribute data by the third workflow component; and
      store, within a data store, data indicative of the output of the first workflow component and of the second workflow component to enable an automated population of input associated with the output of the first workflow component and of the second workflow component within fields associated with the first workflow component and the second workflow component during future executions of the workflow according to a time-to-live policy enforced to prevent a use of stale data in connection with the future executions of the workflow.

11. The system of claim 10, wherein the first instructions and the second instructions are generated based on a selection of options within a graphical user interface presented by the web platform for determining the workflow.

12. The system of claim 10, wherein the first attributes represent first domain objects specific to the first software service and the second attributes represent second domain objects specific to the second software service.

13. The system of claim 10, wherein the backend software is configured to orchestrate the execution of the workflow components using the first software service and using the second software service.

14. The system of claim 10, wherein the one or more servers are configured to:
   obtain, by the backend software, a first output of the first workflow component from the first software service; and
   obtain, by the backend software, a second output of the second workflow component from the second software service.

15. A non-transitory computer readable medium storing instructions operable to cause one or more processors to perform operations comprising:
   configuring an orchestration system of a web platform to orchestrate execution of workflow components of a workflow associated with content hosted by the web platform, wherein the workflow components include a first workflow component associated with a first software service external to the web platform and a second workflow component associated with a second software service internal to the web platform;
   simultaneously generating first and second instructions in a domain-specific language by converting input of the workflow into the domain-specific language, wherein the first instructions correspond to the first workflow component and the second instructions correspond to the second workflow component;

simultaneously causing, by the orchestration system via a first web browser plugin installed to enable a web browser to access the first software service and a second web browser plugin installed to enable the web browser to access the second software service, executions of the first workflow component via the first software service and the second workflow component via the second software service by:

invoking, by the orchestration system, the first instructions in the domain-specific language to produce, by the orchestration system, first computer instructions in a first computer language other than the domain-specific language and usable to cause an execution of the first workflow component by the first software service, wherein the execution of the first workflow component causes a presentation, to a user device accessing the web platform via the web browser, of a first web form configured for collecting a user data element; and invoking, by the orchestration system, the second instructions in the domain-specific language to produce, by the orchestration system, second computer instructions in a second computer language other than the domain-specific language and usable to cause an execution of the second workflow component by the second software service, wherein the execution of the second workflow component causes a presentation, to the user device via the web browser, of a web second form configured for collecting the user data element;

outputting, by the orchestration system based on output of the first workflow component and the second workflow component, an indication of a completion of the workflow-; and mapping a first attribute associated with a first field for the user data element within the first web form to a second attribute associated with a second field for the user data element within the second web form, wherein the mapping between the first attribute and the second attribute enables an automated population within the second field of the user data element collected from within the first web form.

16. The non-transitory computer readable medium of claim 15, wherein configuring the orchestration system comprises:

obtaining selections of options corresponding to candidate workflow components for the workflow, wherein the first instructions and the second instructions are generated based on the selections.

17. The non-transitory computer readable medium of claim 15, wherein the orchestration system is configured to use an application programming interface of the second software service to cause the execution of the second workflow component.

18. The non-transitory computer readable medium of claim 15, wherein the first instructions express elements of the first workflow component as first attributes available to the first software service and the second instructions express elements of the second workflow component as second attributes available to the second software service, the operations comprising:

mapping, by the orchestration system, one or both of the first attributes or the second attributes to one or more other workflow components of the workflow to produce mapping data; and storing, by the orchestration system, data indicative of the first attributes, the second attributes, and the mapping data within a data store available to the orchestration system to enable an automated population of input associated with the first attributes and the second attributes within fields associated with the first workflow component, the second workflow component, and the one or more other workflow components during future executions of the workflow according to a time-to-live policy enforced to prevent a use of stale data in connection with the future executions of the workflow.

19. The non-transitory computer readable medium of claim 15, wherein the first instructions express elements of the first workflow component as first attributes representing first domain objects specific to the first software service and the second instructions express elements of the second workflow component as second attributes representing second domain objects specific to the second software service.

20. The non-transitory computer readable medium of claim 15, the operations comprising:

obtaining a first output of the first workflow component from the first software service and a second output of the second workflow component from the second software service.

* * * * *